US012643453B2

(12) United States Patent (10) Patent No.: US 12,643,453 B2
Kuehner et al. (45) Date of Patent: Jun. 2, 2026

(54) SYSTEMS AND METHODS FOR REDUCING FRICTION ON CARGO AREA SURFACE

(71) Applicant: TOYOTA RESEARCH INSTITUTE, INC., Los Altos, CA (US)

(72) Inventors: Manuel Ludwig Kuehner, Mountain View, CA (US); Hiroshi Yasuda, San Francisco, CA (US); Jaime S. Camhi, Los Gatos, CA (US); Guillermo Pita Gil, Redwood City, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 459 days.

(21) Appl. No.: 17/730,045

(22) Filed: Apr. 26, 2022

(65) Prior Publication Data

US 2023/0339382 A1 Oct. 26, 2023

(51) Int. Cl.
B60P 1/58 (2006.01)
H04R 1/02 (2006.01)
(52) U.S. Cl.
CPC ................ B60P 1/58 (2013.01); H04R 1/025 (2013.01); H04R 2499/13 (2013.01)
(58) Field of Classification Search
CPC ............. B60P 1/00–9/00; B65D 88/66; H04R 1/00–2499/15; B60Y 2410/136; B62M 29/02; B66F 2700/126; B65G 1/00–2814/0398; G05D 1/00–2111/67
USPC ...................................................... 701/1–541
See application file for complete search history.

(56) References Cited

U.S. PATENT DOCUMENTS

| | | | |
|---|---|---|---|
| 2,500,293 A | 3/1950 | O'Connor | |
| 2,621,813 A | 12/1952 | Bauerle | |
| 3,648,862 A | 3/1972 | Sugimoto | |
| 6,209,964 B1 * | 4/2001 | Pinto ...................... | B60P 1/283 414/415 |
| 6,751,333 B1 * | 6/2004 | Azima ..................... | H04R 1/26 381/396 |
| 9,156,622 B1 * | 10/2015 | Chaon .................... | B65G 19/22 |
| 9,415,949 B2 | 8/2016 | Buse | |
| 10,286,828 B1 * | 5/2019 | Rasmussen ............... | B60P 1/58 |
| 2007/0017784 A1 * | 1/2007 | Giovinazzo ............ | B65G 27/04 198/755 |
| 2007/0065261 A1 * | 3/2007 | Chambers ................. | B60P 1/58 414/435 |

(Continued)

FOREIGN PATENT DOCUMENTS

FR 2365458 4/1978

*Primary Examiner* — Mohamed Abdo Algehaim
(74) *Attorney, Agent, or Firm* — SHEPPARD, MULLIN, RICHTER & HAMPTON LLP; Daniel N. Yannuzzi

(57) ABSTRACT

Systems and methods for optimizing the loading or unloading of cargo in a cargo area is provided. Friction-reducing elements, such as rails, may be disposed atop a surface of the cargo area. The friction-reducing elements vibrate pursuant to the application of vibrational energy generated by one or more vibration actuators operatively connected, directly or indirectly, to the friction-reducing elements. The application of vibrational energy reduces the time that cargo contacts the friction-reducing elements, which in turn, reduces the amount of friction applied to the cargo, easing the burden of loading/unloading the cargo.

11 Claims, 10 Drawing Sheets

(56)     References Cited

U.S. PATENT DOCUMENTS

| | | | |
|---|---|---|---|
| 2014/0367224 A1* | 12/2014 | Buse | B65G 65/23 |
| | | | 198/597 |
| 2015/0358727 A1* | 12/2015 | Rizzo | G10K 11/17857 |
| | | | 381/71.4 |
| 2017/0013336 A1* | 1/2017 | Stys | H04R 5/02 |
| 2018/0001827 A1* | 1/2018 | Robertson | B60R 11/06 |
| 2018/0044107 A1* | 2/2018 | Mino | B65D 88/546 |
| 2018/0071662 A1* | 3/2018 | Lanoue | B65D 90/54 |
| 2020/0068866 A1* | 3/2020 | Taylor | A01G 7/06 |
| 2020/0270076 A1* | 8/2020 | Geyer | B65G 47/1421 |
| 2020/0361702 A1* | 11/2020 | Podd | B65G 67/24 |
| 2022/0084497 A1* | 3/2022 | Oh | B60L 15/20 |
| 2023/0021658 A1* | 1/2023 | Benner | B60P 1/283 |
| 2023/0331136 A1* | 10/2023 | Miller | B07B 1/28 |
| 2024/0092239 A1* | 3/2024 | Jing | B60N 2/501 |
| 2025/0020460 A1* | 1/2025 | Shiga | B60P 1/00 |

* cited by examiner

SYSTEMS AND METHODS FOR REDUCING FRICTION ON CARGO AREA SURFACE

TECHNICAL FIELD

The present disclosure relates generally to a vehicle's cargo space, and more particularly to providing mechanisms enabling easier loading/unloading of the vehicle's cargo space, such as vibrating mechanisms that reduce friction between one or more surfaces of the vehicle's cargo space and the cargo being stored therein.

DESCRIPTION OF RELATED ART

Vehicles such as sedans may have a cargo area in the form of an enclosed trunk at the rear of the vehicle. Vehicles such as sport utility vehicles (SUVs) may have a cargo area that is not separated from the rest of the vehicle interior, but rather divided therefrom by virtue of seats/seat mode ("up" in seating position or "down" in cargo position). Vehicles such as trucks have still another type of cargo area in the form of an open truck bed. Other vehicles, may have various cargo areas throughout the interior of the vehicle (e.g., cubbies, glove compartments, etc.) or in other areas external to the vehicle's internal space. For example, rear-engine vehicles may have a cargo area located under the front hood.

Cargo areas are used to store objects for later use, hold/support objects during transport, and so on. Cargo areas can be configurable. For example, the cargo area of an SUV may comprise a cargo area having some first cargo capacity when the rear seats of the SUV are in the up/seating position or mode. That same cargo area can be expanded to comprise some second cargo capacity when the rear seat(s) of the SUV are in the down/cargo mode.

BRIEF SUMMARY OF THE DISCLOSURE

In accordance with some embodiments, a system comprises a processor, and a memory unit operatively connected to the processor. The memory unit includes instructions that when executed cause the processor to: determine an operational state of a vehicle; and cause one or more friction-reduction elements in a cargo area of the vehicle to vibrate in response to a determining that the operational state of the vehicle indicates likelihood of loading into the cargo area or unloading from the cargo area, a cargo item.

In some embodiments, the instructions that when executed cause the processor to determine an operational state of the vehicle comprises instructions that when executed further cause the processor to enable one or more sensors of the vehicle to obtain sensor data indicative of the operational state of the vehicle.

In some embodiments, the instructions that when executed cause the processor to determine an operational state of the vehicle comprises instructions that when executed further cause the processor to determine whether the vehicle is in a parked state.

In some embodiments, the one or more friction-reducing elements comprises a vibrating rail disposed on a surface of the cargo area.

In some embodiments, the system further comprise one or more vibration actuators applying vibrational energy directly to the vibrating rail.

In some embodiments, the one or more vibration actuators applies the vibrational energy in accordance with tuned intensity, tuned frequency, and selective periodicity.

In some embodiments, the system further comprises one or more vibration actuators applying vibrational energy indirectly to the vibrating rail.

In some embodiments, the vibrating rail is disposed on the surface of the cargo via an isolation element allowing the application of the vibrational energy indirectly from the one or more vibration actuators while isolating the vibrating rail from dampening effects of one or more elements of the vehicle.

In some embodiments, the one or more vibration actuators comprises a speaker element of the vehicle.

In accordance with another embodiment, a vehicle comprises a cargo area, and a friction-reducing element disposed on a surface of the cargo area, and a vibration actuator. The vibration actuator is operatively connected to the friction-reducing element and generates vibrational energy and imparts the vibrational energy onto or into the friction-reducing element at least one of during loading of cargo into the cargo area or during unloading of cargo from the cargo area.

In some embodiments, the friction-reducing element comprises a rail having a height such that cargo placed or present thereon is lifted from the surface of the cargo area.

In some embodiments, the vibration actuator is disposed within a hollow portion of the friction-reducing element.

In some embodiments, the vibration actuator is operatively connected to a first end of the friction-reducing element.

In some embodiments, the vibration actuator is operatively connected to a surface of the friction-reducing element opposite a surface of the friction-reducing element contacting cargo.

In some embodiments, the vibration actuator is operatively connected indirectly to the friction-reducing element via an dampening-isolating element connecting the vibration actuator to the surface of the cargo area.

In some embodiments, the vibration actuator comprises an in-vehicle speaker.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
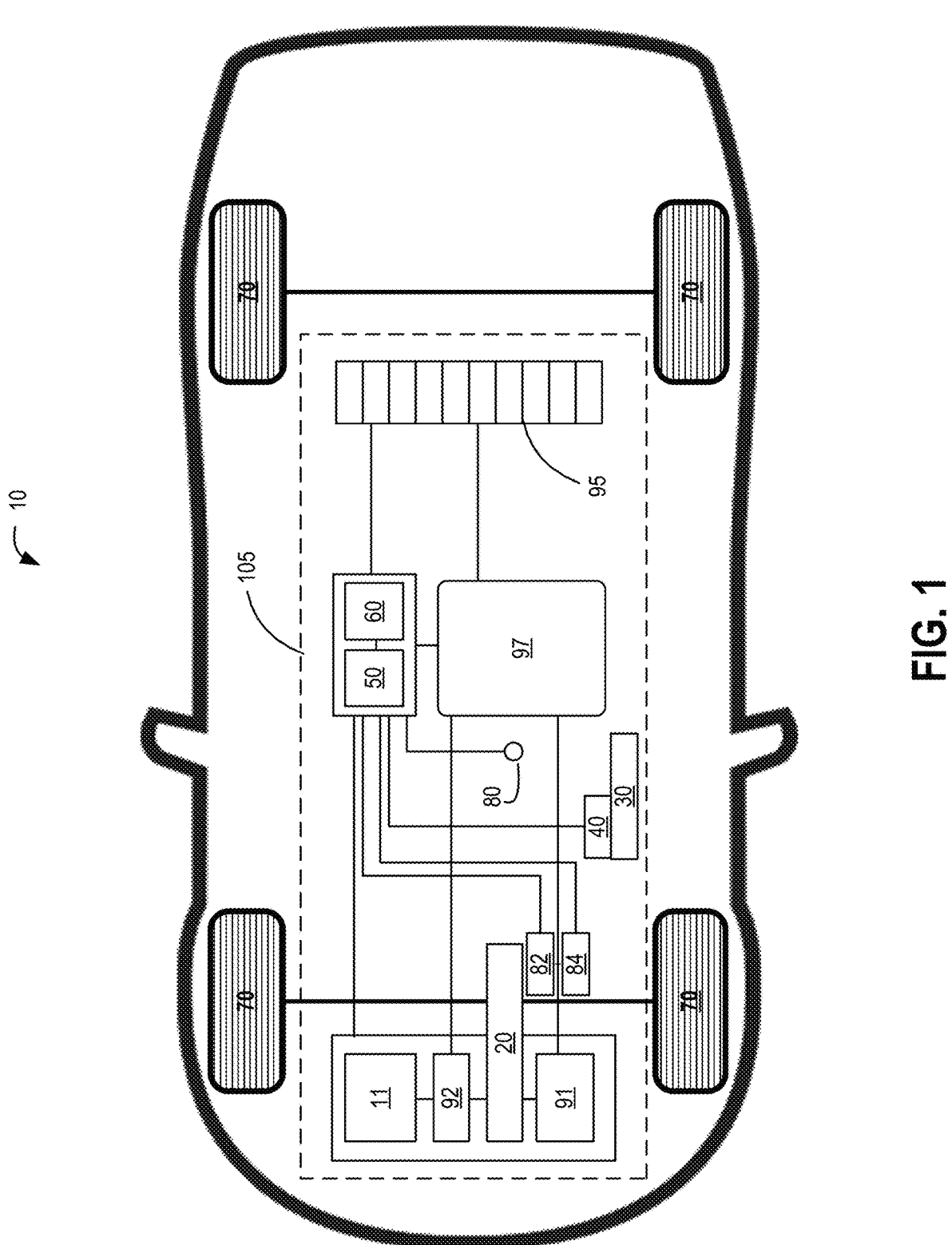
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As noted above, vehicles may have cargo areas that can be used to store/carry items or objects. Users loading cargo into such cargo areas can experience certain difficulties. For example, a user may wish to load an area of a cargo that is difficult to reach for the user, e.g., the cargo area may extend deep into the vehicle's interior. In such a scenario, a user's body may be prohibited from entering the vehicle's interior (e.g., bumper, tail gate edge, etc.), and so the user may need to strain/stretch his or her arms to their full extension in order to push the cargo to the farthest section of the cargo area. In this way, cargo area space is not wasted. In other instances, the mass of certain cargo items is great enough that the cargo must be slid across a surface(s) of the cargo area, again making loading cargo a difficult endeavor. The same can hold true for users when unloading cargo. That is, the weight of certain cargo, the depth at which the cargo is stored within a cargo area, etc. can make it difficult to unload cargo, e.g., pull or maneuver cargo closer to the user until the user can lift or otherwise remove the cargo from the cargo area.

It should be understood that friction between a surface(s) of a cargo item to be loaded/unloaded and a surface(s) of the cargo area can play at least some role, if not a major role, in the resulting difficulty a user may experience when loading/ unloading cargo. That is, the frictional forces generated or arising out of moving (e.g., sliding) contact between a cargo item's surface(s) and those of the cargo area can create resistance that a user must overcome in order to move the cargo into/out of the cargo area. Sometimes, when various cargo items' surfaces are in contact with one another, the friction created or present therebetween, especially if the weight of one or more cargo items works to increase such friction (e.g., when cargo items lean against one another), may also result in resistance to movement.

Accordingly, embodiments of the present disclosure are directed to mechanisms that can reduce the amount of friction present or generated between at least one surface of a cargo item and another surface, e.g., that of a cargo area, that of another cargo item, and so on. In some embodiments, friction-reducing elements may be implemented in the cargo area(s) of a vehicle, and may be implemented in the form of load-bearing elements, such as rails, which are capable of being vibrated. The vibration acts to reduce friction between a surface(s) of the rails and a surface(s) of a cargo item being loaded thereon, unloaded therefrom. It should be understood that by virtue of vibrating a rail(s) on which cargo is placed or moved, the amount of time that the cargo is in actual, physical contact with a rail(s) is minimized. Without actual, physical contact between surfaces, friction ceases to exist, and moving the cargo items becomes easier and less of a chore.

The manner of vibration can vary, e.g., vibration forces can be generated on or otherwise provided to the rails such that the rails vibrate in a variety of directions. For example, rails can be configured to vibrate in a horizontal matter (e.g., substantially in-plane with a bottom surface of a cargo area), in a vertical manner (e.g., in a direction substantially orthogonal to the bottom surface of a cargo area), or other directions, or combinations of directions. One or more actuators, such as piezo-electric or piezo-ceramic type actuators may be used to generate dynamic motion that can be imparted to the aforementioned rails. The type(s) of actuators used to impart vibration to the rails can vary. Those of ordinary skill in the art would understand what actuators may be appropriate for generating the desired vibration. In some embodiments, one or more elements of the vehicle in which the cargo area is located may be leveraged to provide the requisite vibration forces. For example, a subwoofer or other in-vehicle speaker, that already generates vibrations when outputting audio, e.g., speakers convert electrical energy (from the audio) into mechanical energy (motion), which in turn compresses air and converts the motion into sound energy or sound pressure.

In some embodiments, the material(s) used for manufacturing the rails can be a material that exhibits high levels of friction relative to objects (in this context, cargo, e.g., boxes, bags, bare items, etc.). In this way, when such rails are not being vibrated, e.g., when cargo items resting thereon are in transport (while the vehicle is in motion), the cargo items will experience less (or no) shifting or movement. However, when vibratory energy is provided to such rails having high surface friction, as discussed above, that friction is only sporadically or periodically applied to/experienced by a cargo item (in accordance with a frequency of vibration). However, the above example is non-limiting, and those of ordinary skill in the art would understand what materials (now-known or later-discovered) may be appropriate for a given application.

The systems and methods disclosed herein may be implemented with or by any of a number of different vehicles and vehicle types. For example, the systems and methods disclosed herein may be used with automobiles, trucks, recreational vehicles and other like on- or off-road vehicles. In addition, the principles disclosed herein may also extend to other vehicle types as well.

FIG. 1 illustrates an example vehicle 10 in which various embodiments for cargo optimization may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

Vehicle 10 can include drive force unit 5 and wheels 70. Drive force unit 5 may include an engine 11, motor generators (MGs) 91 and 92, a battery 95, an inverter 97, a brake pedal 30, a brake pedal sensor 40, a transmission 20, a memory 60, an electronic control unit (ECU) 50, a shifter 80, a speed sensor 82, and an accelerometer 84.

Engine 10 primarily drives the wheels 70. Engine 10 can be an ICE that combusts fuel, such as gasoline, ethanol, diesel, biofuel, or other types of fuels which are suitable for combustion. The torque output by engine 11 is received by the transmission 20. MGs 91 and 92 can also output torque to the transmission 20. Engine 10 and MGs 91 and 92 may be coupled through a planetary gear (not shown in FIG. 1B). The transmission 20 delivers an applied torque to the wheels 70. The torque output by engine 11 does not directly translate into the applied torque to the wheels 70.

MGs 91 and 92 can serve as motors which output torque in a drive mode, and can serve as generators to recharge the battery 95 in a regeneration mode. The electric power delivered from or to MGs 91 and 92 passes through inverter 97 to battery 95. Brake pedal sensor 40 can detect pressure applied to brake pedal 30, which may further affect the applied torque to wheels 70. Speed sensor 82 is connected to an output shaft of transmission 20 to detect a speed input which is converted into a vehicle speed by ECU 50. Accelerometer 84 is connected to the body of vehicle 10 to detect the actual deceleration of vehicle 10, which corresponds to a deceleration torque.

Transmission 20 is a transmission suitable for any vehicle. For example, transmission 20 can be an electronically controlled continuously variable transmission (ECVT), which is coupled to engine 11 as well as to MGs 91 and 92. Transmission 20 can deliver torque output from a combination of engine 11 and MGs 91 and 92. The ECU 50 controls the transmission 20, utilizing data stored in memory 60 to determine the applied torque delivered to the wheels 70. For example, ECU 50 may determine that at a certain vehicle speed, engine 11 should provide a fraction of the applied torque to the wheels while MG 91 provides most of the applied torque. ECU 50 and transmission 20 can control an engine speed ($N_E$) of engine 11 independently of the vehicle speed (V).

ECU 50 may include circuitry to control the above aspects of vehicle operation. ECU 50 may include, for example, a microcomputer that includes a one or more processing units (e.g., microprocessors), memory storage (e.g., RAM, ROM, etc.), and I/O devices. ECU 50 may execute instructions stored in memory to control one or more electrical systems or subsystems in the vehicle. ECU 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 91 and 92 each may be a permanent magnet type synchronous motor including for example, a rotor with a permanent magnet embedded therein. MGs 91 and 92 may each be driven by an inverter controlled by a control signal from ECU 50 so as to convert direct current (DC) power from battery 95 to alternating current (AC) power, and supply the AC power to MGs 91, 92. MG 92 may be driven by electric power generated by motor generator MG91. It should be understood that in embodiments where MG91 and MG92 are DC motors, no inverter is required. The inverter, in conjunction with a converter assembly may also accept power from one or more of MGs 91, 92 (e.g., during engine charging), convert this power from AC back to DC, and use this power to charge battery 95 (hence the name, motor generator). ECU 50 may control the inverter, adjust driving current supplied to MG 92, and adjust the current received from MG91 during regenerative coasting and braking.

Battery 95 may be implemented as one or more batteries or other power storage devices including, for example, lead-acid batteries, lithium ion, and nickel batteries, capacitive storage devices, and so on. Battery 95 may also be charged by one or more of MGs 91, 92, such as, for example, by regenerative braking or by coasting during which one or more of MGs 91, 92 operates as generator. Alternatively (or additionally, battery 95 can be charged by MG 91, for example, when vehicle 10 is in idle (not moving/not in drive). Further still, battery 95 may be charged by a battery charger (not shown) that receives energy from engine 11. The battery charger may be switched or otherwise controlled to engage/disengage it with battery 95. For example, an alternator or generator may be coupled directly or indirectly to a drive shaft of engine 11 to generate an electrical current as a result of the operation of engine 11. Still other embodiments contemplate the use of one or more additional motor generators to power the rear wheels of a vehicle (e.g., in vehicles equipped with 4-Wheel Drive), or using two rear motor generators, each powering a rear wheel.

Battery 95 may also be used to power other electrical or electronic systems in the vehicle. Battery 95 can include, for example, one or more batteries, capacitive storage units, or other storage reservoirs suitable for storing electrical energy that can be used to power MG 91 and/or MG 92. When battery 95 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
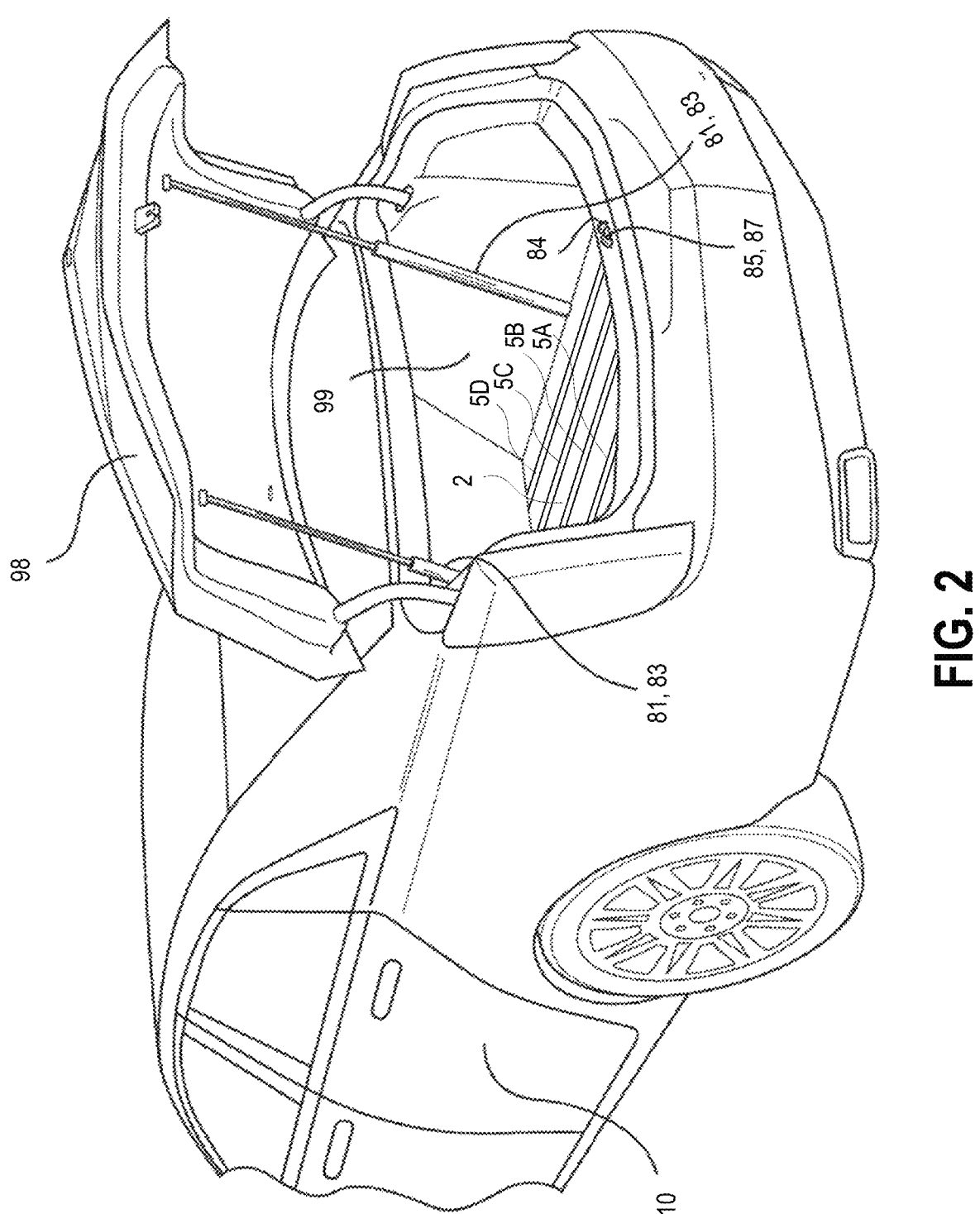
FIG. 2 illustrates a perspective view of an example cargo area of a vehicle in accordance with some embodiments.

FIG. 2 is a schematic perspective rear view of one example of the vehicle 10 showing a cargo area in the form of a vehicle trunk 99 and a cargo area door 98 in the form of a trunk lid. The vehicle 10 is provided with cargo area door opening and closing mechanisms 81/83 in the form of one or more hydraulic cylinders which are operable to perform both the door opening and closing functions. Vehicle 10 may employ other types of opening and closing mechanisms. Vehicle 10 is also provided with locking and unlocking mechanisms 84/85/87 to lock and unlock the cargo area door 98 when the cargo area door 98 is in a closed configuration.

As illustrated in FIG. 2 vehicle trunk 99 includes a "bottom" surface or platform 2. Surface 2 may further comprise or have implemented thereon, a plurality of rails 3A, 3B, 3C, and 3D. It should be understood that rails 3A-3D are non-limiting examples of vibrating elements in accordance with some embodiments of the present disclosure. However, the shape or size of the rails may differ, or maybe configured in some way/as some element other than a rail or beam. In some embodiments, vibrating elements may be shaped differently, positioned differently (whether relative to surface 2 or other aspect of vehicle trunk 99, or relative to each other), etc. Also, the number of rails or vibrating elements can vary. Further still, although the illustrated embodiment reflects an embodiment wherein the vibrating rails are positioned on the bottom surface of vehicle trunk 99, it should be understand that such vibrating rails can be implemented or disposed anywhere deemed to be of use, e.g., side walls/surfaces of a cargo area, such as vehicle trunk 99.

Figure 3A:
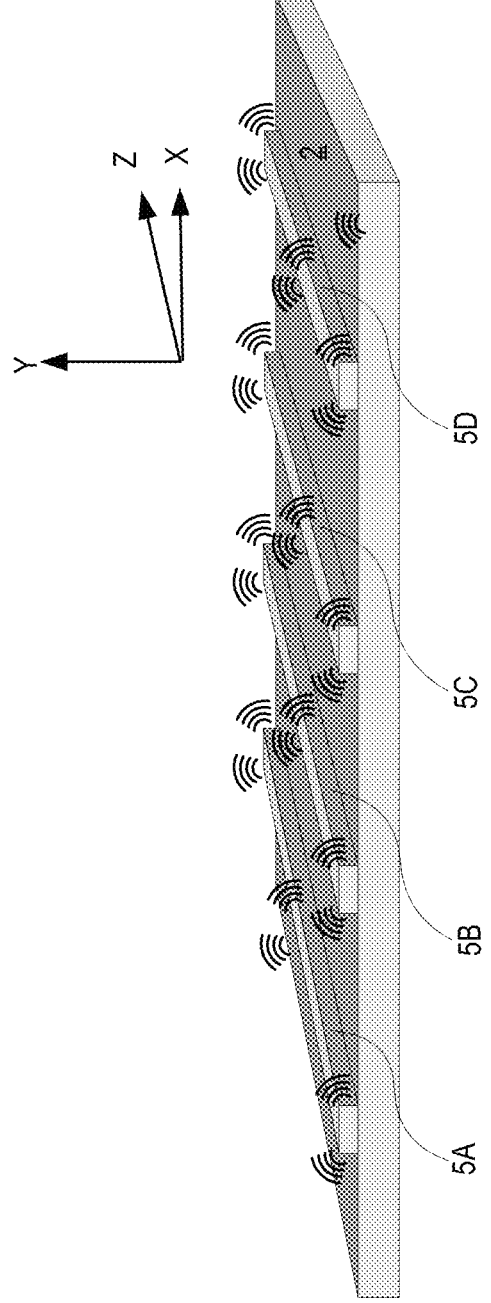
FIG. 3A is a perspective view of example vibrating elements atop a cargo area surface in accordance with some embodiments.

FIG. 3A illustrates a perspective view of an example surface 2 of vehicle trunk 99, on which a plurality of rails/beams 5A, 5B, 5C, and 5D are disposed. As illustrated, when rails 5A-5D are activated, rails 5A-5D vibrate. The frequency of the vibration, the directionality of the vibration, the intensity of the vibration, or other vibration characteristics may vary in accordance with certain factors. For example, a determination may be made that certain cargo items to be transported atop surface 2/vibrating rails 5A-5D may be benefitted (during loading or unloading thereof) by the application of vibrational force(s) to such surface/rails in a particular direction due to the shape or weigh of the cargo items at issue. Coordinate axes X, Y, and Z are illustrated in FIG. 3A. It should be understood that vibrational energy or forces can be applied in any of those directions, or other directions. Accordingly, vibrating rails 5A-5D, via one or more actuators (discussed in greater detail below) maybe be configured to operate to apply the requisite amount of vibrations, in the requisite direction(s), at the requisite frequency, and so on.

It should be noted that in some embodiments, vibrating rails 5A-5D elevate a cargo item, such as cargo item 6 from the surface 2. In some scenarios, this elevation mitigates the frictional effects of surface 2 on cargo item 6. The amount of elevation provided by vibrating rails 5A-5D can vary, e.g., based on the type of cargo items anticipated as being loaded into vehicle trunk 99. In can also be appreciated that in some scenarios, the size of a cargo item or position of the cargo item may result in an edge(s) or corner(s) or other portion(s) of the cargo item becoming jammed/lodged between two or more vibrating rails or pushed into one or more vibrating rails, etc. In such circumstances, the vibrations applied to such a cargo item vis-à-vis one or more of vibrating rails 5A-5D can also help alleviate the frictional resistance experienced when loading/unloading cargo items experiencing such positional difficulties or anomalies.

Figure 3B:
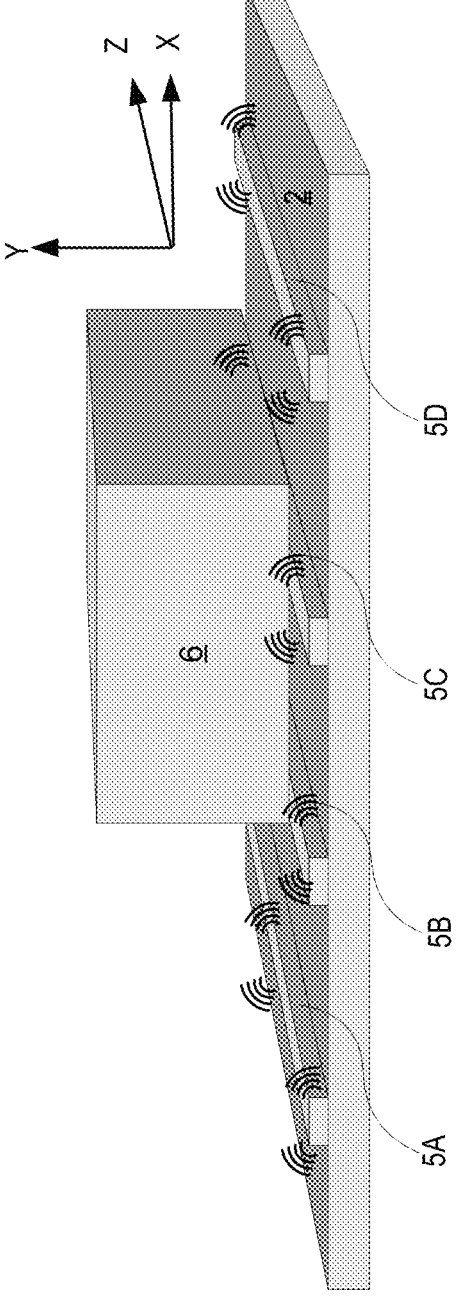
FIG. 3B is a perspective view of an example cargo item atop the vibrating elements of FIG. 3A.

As alluded to above, the material(s) used for such vibrating rails can vary, and in some embodiments, may be a consideration or factor in determining the requisite amount/type of vibrations to be applied thereto. Typically, surface 2 of vehicle trunk 99 is covered in a fabric material, e.g., a rug-like materials, or with some type of plasticized or rubberized material. Such materials can impart unwanted friction to cargo item surfaces when loading or unloading such cargo items. Accordingly, the vibration of rails 5A-5D reduce the amount of time such cargo items are in contact with rails 5A-5D, thereby negating (or at least mitigating) the effects of friction when such cargo items are not in contact with rails 5A-5D. Thus, when rails 5A-5D are vibrating, the loading/unloading of a cargo item, such as cargo item 6 (FIG. 3B, illustrating a perspective view of an example cargo item atop the vibrating elements of FIG. 3A) can be facilitated. In some embodiments, rails (or other vibrating elements) may be canted in a certain direction to, in conjunction with the vibration, further facilitate loading/unloading of cargo items.

In some embodiments, the applied vibration may vary along the length of a rail. This may be helpful, e.g., in the case that vehicle trunk 99 or vehicle 10 itself is canted or tilted in a particular direction. For example, if vehicle 10 is parked on an uphill grade, cargo items loaded towards the rear of vehicle trunk 99 (i.e., in the direction of the Z arrow in FIG. 3B), it can be appreciated that such cargo items may (due to the uphill grade) slip or fall in an opposite direction (i.e., in a direction opposite that of the Z arrow). Accordingly, vibration may be effectuated towards the rear of vehicle trunk 99 (in the direction of the Z arrow), while vibration may be effectuated to a lesser extent (less intensity, for example) or not at all towards the front of vehicle trunk 99 (in the direction opposite that of the Z arrow). Thus, certain conditions (whether vehicle-driven, environmentally-driven, or otherwise) that may have a negative impact on loading/unloading of cargo items may be countered.

Figure 4:
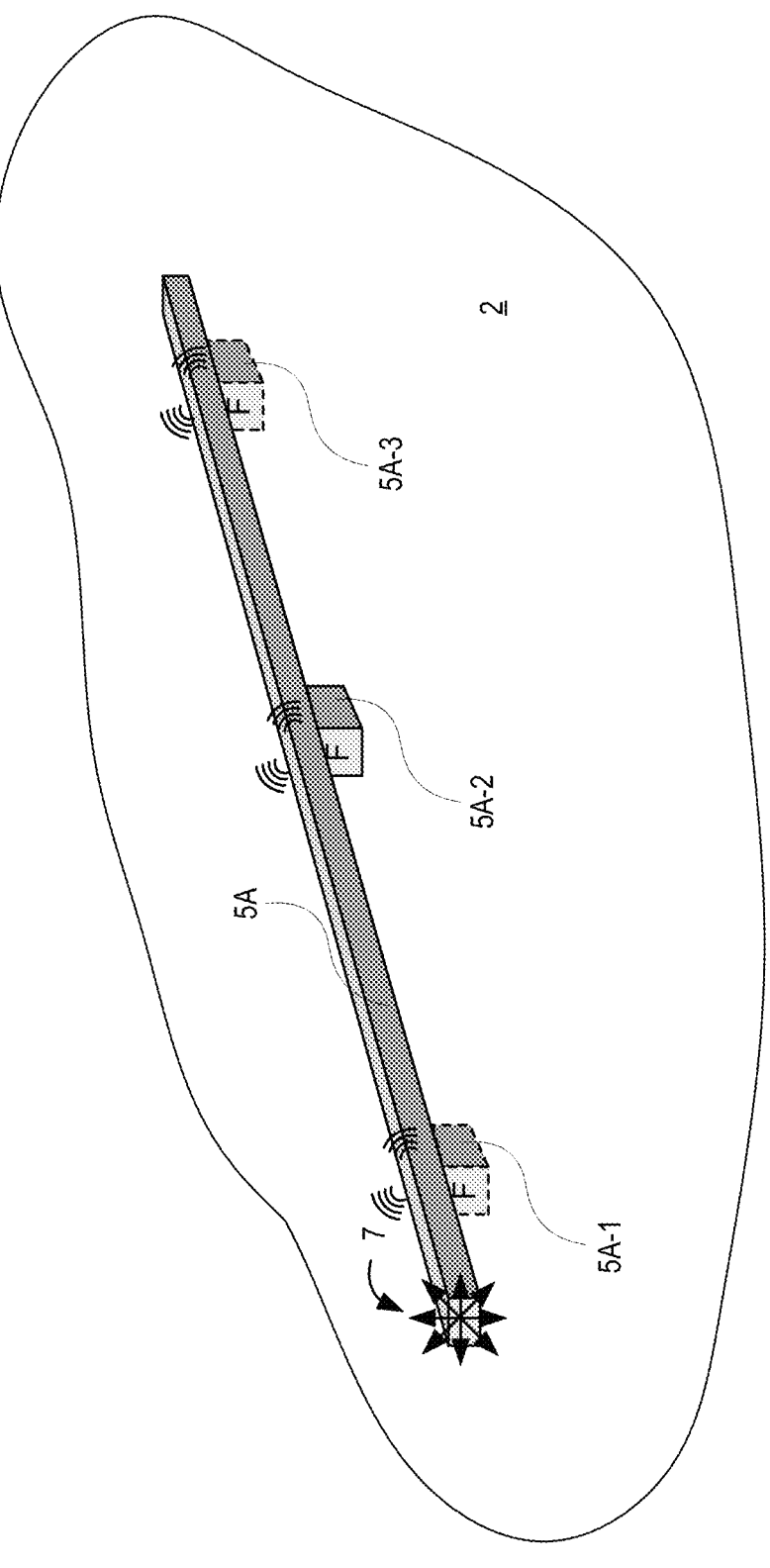
FIG. 4 is a perspective view of an example vibrating element in accordance with some embodiments.

FIG. 4 is a perspective view of an example vibrating element in accordance with some embodiments. FIG. 4 illustrates an example implementation, wherein a vibrating element, such as rail 5A imparts vibrations onto/into a cargo item by way of one or more vibration actuators, e.g., vibration actuators 5A-A, 5A-2, and 5A-3. As alluded to above, the number and placement of such actuators can vary. For example, a single vibration actuator 5A-2 may be used in accordance with some embodiments, whereas in some other embodiments, additional vibration actuators may be used, e.g., actuators 5A-1 or 5A-3. Arrows 7 illustrate example directions of vibrations that may be effectuated through the use of any one or more of vibration actuators 5A-1, 5A-2, and 5A-3. As discussed above, the application of vibrations via one or more of vibration actuators 5A-1, 5A-2, or 5A-3 may be selectively applied. In some embodiments, such vibration actuators may be independently controllable to achieve a desired vibration "pattern." In some embodiments, vibration actuators 5A-1, 5A-2, and 5A-3 may be linear resonant actuator (LRA) vibration actuators or motors, also known as linear vibrators. In other embodiments, vibration actuators 5A-1, 5A-2, and 5A-3 may be eccentric rotating mass (ERM) vibrators, although those of ordinary skill in the art would understand that various actuators or mechanisms may be used, either known now or known in the future.

Figure 5:
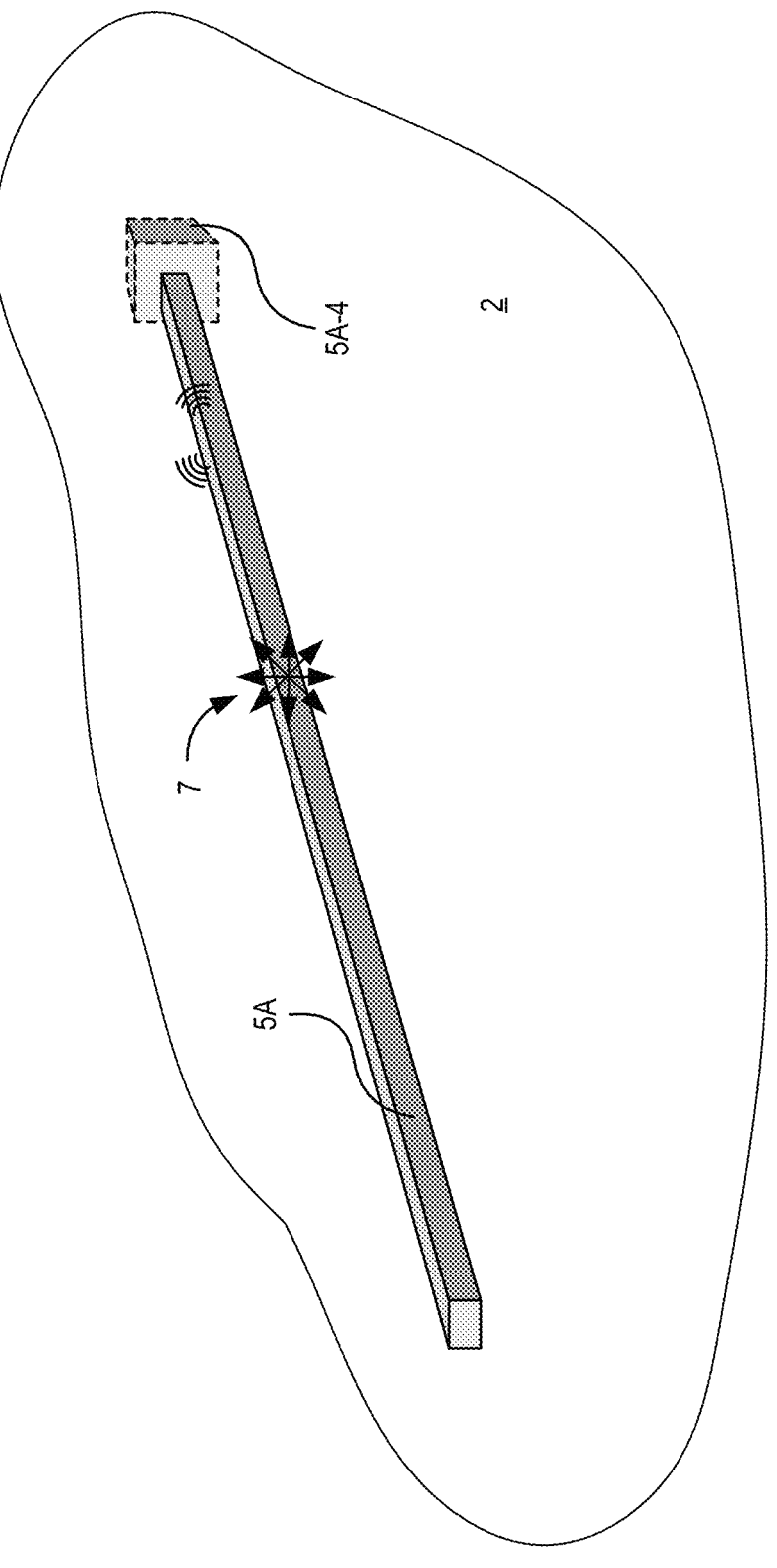
FIG. 5 is a perspective view of an example vibrating element in accordance with some embodiments.

FIG. 5 is a perspective view of an example vibrating element in accordance with some embodiments. In the illustrated example of FIG. 5, a vibration actuator 5A-4 is disposed at one end of a vibrating rail, such as vibrating rail 5A. Again, possible directions of vibration are represented by arrows 7. It should be understood that the intensity of the vibrations imparted onto vibrating rail 5A by vibration actuator 5A-4 may, in some embodiments, be more intense at locations/areas along the length of vibrating rail 5A-4 near vibration actuator 5A-4. In some embodiments, the intensity may be large enough that from the perspective of reducing friction against cargo item surfaces, the difference in intensity along the length of vibrating rail 5A-4 may not practically matter.

Figure 6:
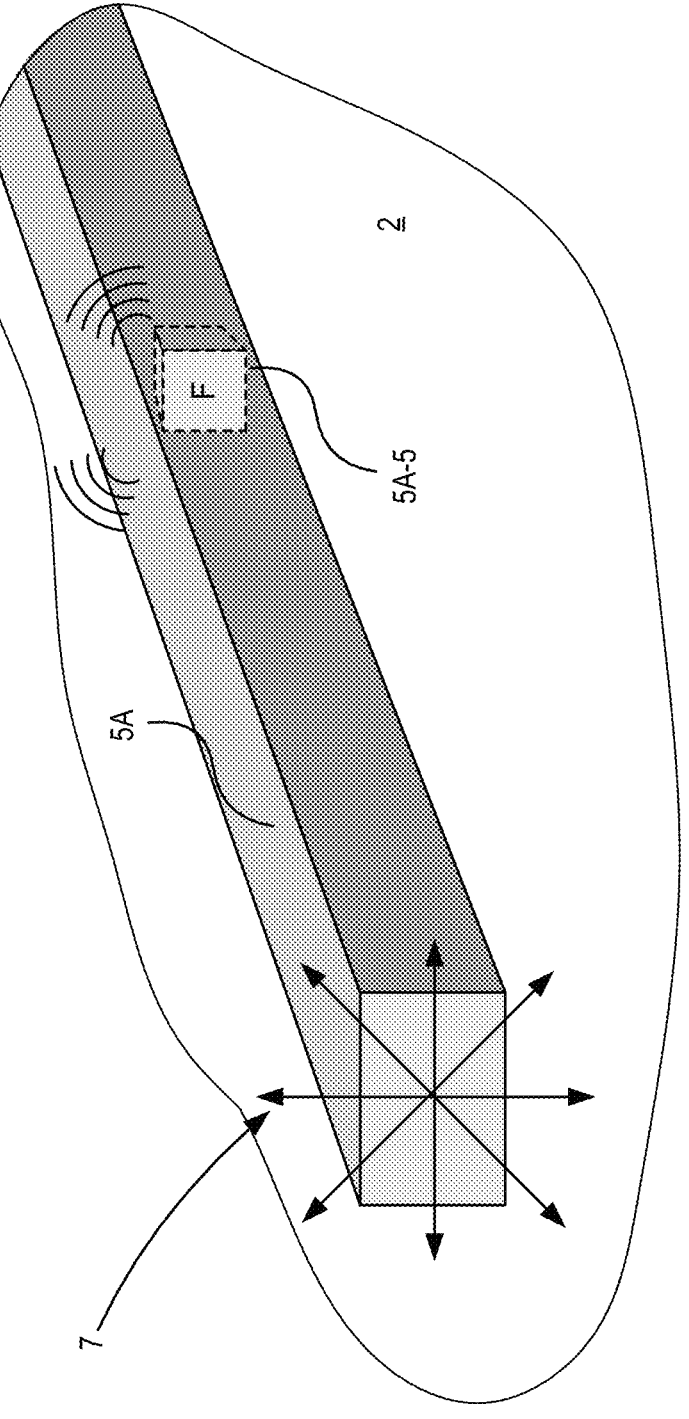
FIG. 6 is a perspective view of an example vibrating element in accordance with some embodiments.

FIG. 6 is a perspective view of an example vibrating element in accordance with some embodiments. As illustrated in FIG. 6, yet another manner of effectuating vibrations in a vibrating rail, such as vibrating rail 5A, may be an internally disposed vibration actuator, such as vibration actuator 5A-5. Vibration actuator 5A-5 may be an LRA-type vibration actuator, an ERM-type vibration actuator, or other appropriate actuator. Although only a single vibration actuator 5A-5 is illustrated in this example embodiment, it should be understood that additional actuators may be used. In this, and other embodiments, the material(s) used to manufacture vibrating rails, such as vibrating rail 5A, may be more or less pliable or flexible so that vibrational forces generated by the vibration actuators may be "felt" by or imparted to cargo items more effectively.

Figure 7:
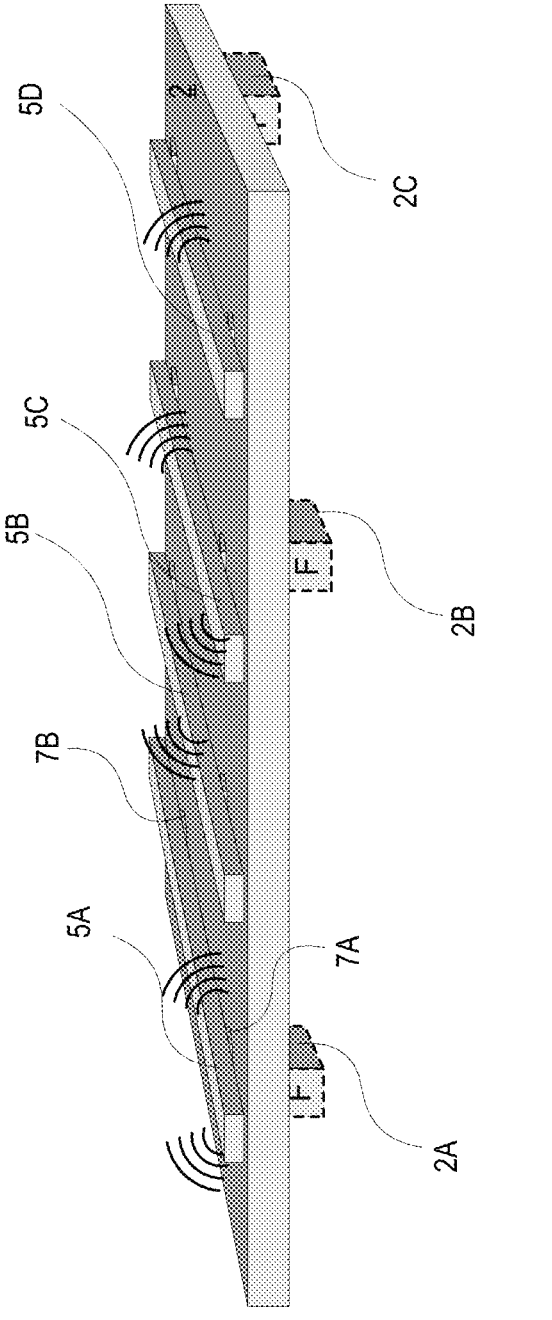
FIG. 7 is a perspective view of an example vibrating surface that imparts vibrations onto elements in accordance with some embodiments.

FIG. 7 is a perspective view of an example vibrating surface that imparts vibrations onto elements in accordance with some embodiments. As illustrated in FIG. 7, the application of vibrational forces may be accomplished, in some embodiments, indirectly, in this case vis-à-vis vibration actuators 2A, 2B, and 2C. In some embodiments, vibration actuators 2A, 2B, and 2C may comprise LRA- or ERM-type vibration actuators. However, in some embodiments, one or more of vibration actuators 2A, 2B, or 2C, may be representative of an existing component or element of vehicle 10 that can be leveraged to impart vibratory forces onto/into vibrating rails 5A-5D. Vibration actuators 2A, 2B, and 2C may be representative of in-vehicle speakers, for example. Such implementations may be useful to "retrofit" existing rails/beams of a vehicle, although vibration actuators such as those already discussed above, can be embodied as modular/after-market vibration actuators.

As will be discussed below, vehicles, such as vehicle 10 may use certain dampening elements, e.g., shock absorbers, to dampen the effects of roadway elements on vehicle 10 while being operated. Accordingly, in some embodiments, isolating elements, two of which are labeled as 7A and 7B may be used to isolate vibrating rails 5A-5D from surface 2, which can be dampened by elements of vehicle 10. In order not to suppress the intentional vibrational forces being applied to vibrating rails 5A-5D, isolation elements may be used to allow vibrating rails 5A-5D to still vibrate. Isolation elements may be hinged mechanisms, or mechanisms that have easily-moved components that can effectively transfer indirectly-applied vibrations to vibrating rails 5A-5D. In some embodiments, a first set of vibration actuators may be used to impart desired vibrational forces to vibrating rails 5A-5D, e.g., vibration actuators 2A and 2B, while a second sent of vibration actuators, such as 2C may be configured to cancel/counteract to some level, the vibration of vibration actuators 2A and 2B, again, to "tune" the vibrational forces applied to vibration rails 5A-5D or to account for vehicle operating characteristics or conditions that might work against the desired vibrational forces.

It should be understood that the frequency of applied vibrations can be tuned or varied. For example, to mitigate annoying sounds/hums due to vibrations, vibrational frequencies applied by any of the aforementioned vibration actuators can be tuned such that the frequency is optimized to be, e.g., between lower vibrational frequencies that can be felt by vehicle passengers (e.g., approximately 20 Hz or below), and higher vibrational frequencies that can be heard (e.g., approximately 20 Hz or higher).

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 8:
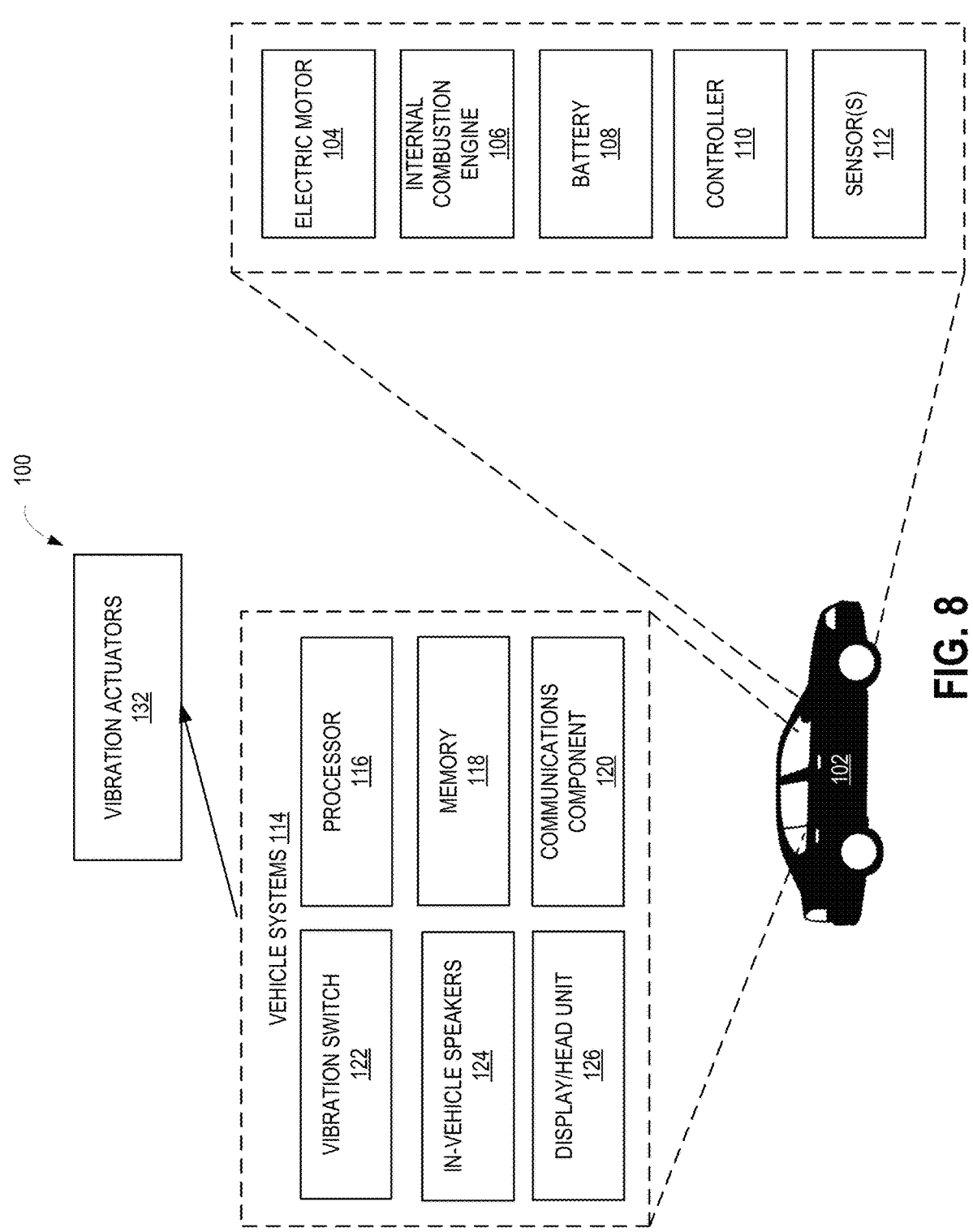
FIG. 8 illustrates an example system architecture for effectuating vibrating elements in a cargo area in accordance with embodiments.

FIG. 8 illustrates an example system architecture for effectuating vibrating elements in a cargo area in accordance with embodiments. FIG. 8 illustrates an example system 100 for cooperative operation of external speakers and in-vehicle speakers/entertainment systems that allow for balance adjustment of the external speakers in accordance with various embodiments. FIG. 8 illustrates a vehicle 102, which can be a hybrid vehicle having an electric motor 104 and an internal combustion engine 106, both of which generate driving force. Various types of internal combustion engines may be embodied by internal combustion engine 106, such as a gasoline or diesel engine. Various types of electric motors may be embodied by electric motor 104, such as a brushless direct current (DC) motor, an induction motor, or a DC shunt motor. It should be noted that various embodiments are not limited to use in/for a hybrid vehicle, but any vehicle or any other structure, body, or entity having a Bluetooth-enabled system that can be operatively connected to one or more Bluetooth speakers located external to the vehicle, structure, body, entity.

Hybrid vehicle 102 may include a battery 108 for supplying electric power to drive electric motor 104. Battery 108 may be a rechargeable battery, such as, for example, a lead-acid battery, a nickel-cadmium battery, a natrium sulphur battery, a lithium rechargeable battery, a hydrogen rechargeable battery or a redox type battery. Battery 108 may also be a mass storage condenser, or other suitable power source. It should be noted that hybrid vehicle 102 may have more than one battery, and applying pre-charge timing as described herein can be coordinated between the multiple batteries.

Although not shown, it should be understood that hybrid vehicle 102 may further comprise a battery current/voltage detection sensor for detecting electric current and voltage of battery 108. Hybrid vehicle 102 may also include a driver for changing electric current supplied from the battery 108 into an electric value to produce a predetermined torque by electric motor 104. The driver may further control regeneration current flow electric motor 104 to the battery 108. Hybrid vehicle 102 may include other un-illustrated components typically found in hybrid vehicles, such as an engine control system, a braking system/components, a steering system/components, logic components, other processors, etc.

Hybrid vehicle 102 may include a controller 110 that controls the overall operation of hybrid vehicle 102, one or more sensors 112 connected to the controller 110 also connected to the controller 110. Controller 110 can judge driving conditions based on various detection signals supplied from the one or more sensors 112 in order to define the driving condition of the hybrid vehicle, and in some embodiments, automatically or dynamically engaging (or disengaging) vibration actuators. It should be noted that various embodiments described herein are not limited to use with a hybrid vehicle. Various embodiments may be implemented in/for use with any type of vehicle. In still other embodiments, various embodiments may be implemented in any context/structure/apparatus/mechanism in which auto-balancing of Bluetooth-enabled speakers sharing audio with another Bluetooth-enabled system, speakers, etc.

Vehicle systems 114 of hybrid vehicle 102 may include processor 116, as well as memory 118. In some embodiments, additional components may make up vehicle systems 114.

One or more communications components 120 may connect vehicle systems 114 (and components therein) to one or more external devices or networks or to other elements or devices of vehicle 10. Vehicle systems 114 may further include one or more in-vehicle speakers 124 through which audio, for example, originating from an audio system aspect or element of display/head unit 126, which can include a radio, some other in-vehicle media source, etc. In-vehicle speakers 124 may further output audio originating from devices, such as smartphones (not shown) and streamed/relayed through display/head unit 126 and on to in-vehicle speakers 124, for example.

A display/head unit 126 may be included as party of vehicle systems 114, and can comprise one or more input/output mechanisms or interfaces through which a user, such as an operator or passenger of vehicle 102, may control one or more components/functionality of vehicle 102. For example, display/head unit 126 may comprise navigation components, heating ventilation and air conditioning (HVAC) system/interface(s), as well as a media component, such as an audio system.

Vehicle systems 114 may further include a vibration switch 122, which may be any actuatable device that a user can signal to processor 116, that he/she desires to enable vibrational elements of vehicle 102 in a cargo area(s) of vehicle 102. Accordingly, processor 116 may signal control or instruction signals to vibration actuators 132 (which may be embodiments of the aforementioned vibration actuators) or to in-vehicle speakers 124 (which can be leveraged to impart vibrations as previously discussed).

In some embodiments, sensors 112 may be sensors capable of determination operational states of vehicle 102, such as if vehicle 102 is in a parked state, whether or not a cargo area of vehicle 102 is open (and thus presumably, loading/unloading of cargo will commence), and so on. Accordingly, in some embodiments, when sensors 112 detect a situation where vibration of one or more vibrating elements in one or more cargo areas of vehicle 102 may be warranted, processor 116 may automatically enable vibration actuators 132. In some embodiments, when sensors 112 detect that vehicle 102 is in motion, and vibration is unwarranted (as described above, vibration can reduce the applicable friction to cargo items that could result in slippage), processor 116 may disable vibration switch 122 (rendering it un-actuatable by a user), or may automatically/dynamically stop operation of vibration actuators 132.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In one or more arrangements, one or more of the components described herein can include artificial or computational intelligence elements, e.g., neural network, fuzzy logic or other machine learning algorithms. Further, in one or more arrangements, one or more of the components can be distributed among a plurality of the components described herein. In one or more arrangements, two or more of the components described herein can be combined into a single component.

Although specific components will be described herein, it is understood that additional controls, systems and/or modules may be included if needed to perform the functions described herein, depending on the design of a particular vehicle. Vehicle embodiments described herein are assumed to include sufficient systems and/or elements to autonomously execute all of the commands needed to perform the various cargo optimization operations disclosed herein.

Figure 9:
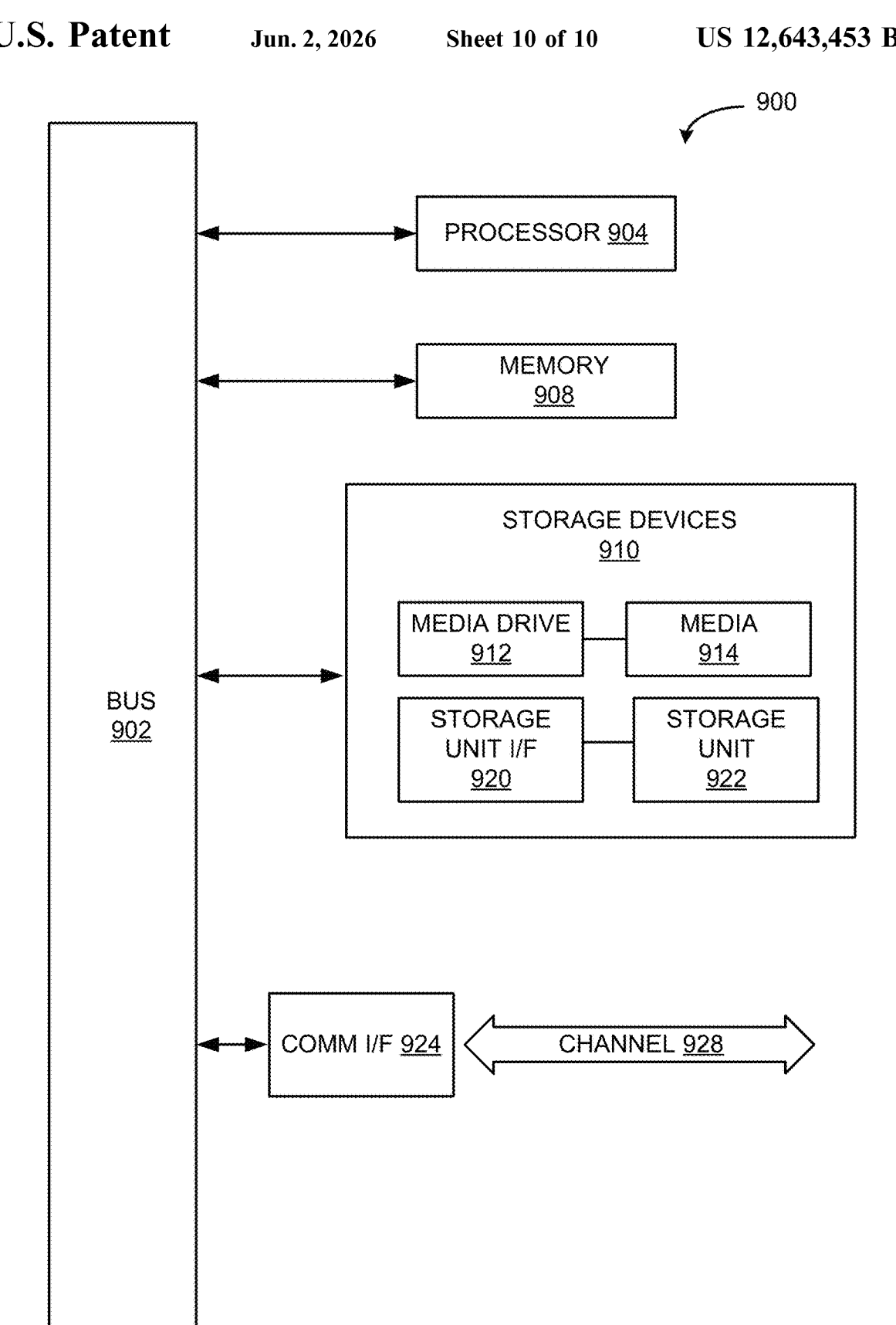
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor 904. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   one or more processors; and
   memory operatively connected to the one or more processors and including instructions that when executed by at least one of the one or more processors cause the system to:
      determine at least one of weight or shape of a cargo item loaded into a cargo area of a vehicle;
      determine a vibration pattern for facilitating unloading of the cargo item based on the determined at least one of weight or shape of the cargo item; and
      individually cause friction-reduction elements in the cargo area to vibrate with different vibration characteristics in accordance with the determined vibration pattern to facilitate unloading of the cargo item.

2. The system of claim 1, wherein a respective friction-reducing element comprises a vibrating rail disposed on a surface of the cargo area.

3. The system of claim 2, further comprising one or more vibration actuators applying vibrational energy directly to the vibrating rail.

4. The system of claim 3, wherein the one or more vibration actuators applies the vibrational energy in accordance with tuned intensity, tuned frequency, and selective periodicity of the determined vibration pattern.

5. The system of claim 2, further comprising one or more vibration actuators applying vibrational energy indirectly to the vibrating rail.

6. The system of claim 5, wherein the vibrating rail is disposed on the surface of the cargo via an isolation element allowing an application of the vibrational energy indirectly from the one or more vibration actuators while isolating the vibrating rail from dampening effects of one or more elements of the vehicle.

7. The system of claim 5, wherein the one or more vibration actuators comprises a speaker element of the vehicle.

8. The vehicle of claim 1, wherein the different vibration characteristics comprise at least one of:

different vibration intensities;

different vibration frequencies;

different vibration periodicities; or different vibration directionalities.

9. The vehicle of claim 1, wherein the determined vibration pattern controlling a respective friction-reduction element comprises controlling the respective friction reduction element to have varied vibration characteristics along a length of the respective friction-reduction element.

10. A vehicle, comprising:

one or more processors; and memory operatively connected to the one or more processors and including instructions that when executed by at least one of the one or more processors cause the vehicle to:

determine the vehicle is parked on a hill grade; and individually cause friction-reduction elements in a cargo area of the vehicle to vibrate with varied vibration characteristics from a rear of the cargo area to a front of the cargo area to counter the hill grade when loading a cargo item into the cargo area or unloading the cargo item out of the cargo area.

11. The vehicle of claim 10, wherein the varied vibration characteristics comprise at least one of:

vibration intensity;

vibration frequency;

vibration periodicity; or vibration directionality.

* * * * *